United States Patent [19]

Hayakawa et al.

[11] Patent Number: 4,707,417
[45] Date of Patent: Nov. 17, 1987

[54] MAGNETIC COMPOSITE FILM

[75] Inventors: Masatoshi Hayakawa; Koichi Aso; Yoshitaka Ochiai; Hideki Matsuda; Kazuhiko Hayashi; Wataru Ishikawa; You Iwasaki, all of Kanagawa, Japan

[73] Assignee: Sony Corporation, Tokyo, Japan

[21] Appl. No.: 755,675

[22] Filed: Jul. 16, 1985

[30] Foreign Application Priority Data

Jul. 19, 1984 [JP] Japan .................................. 59-150429

[51] Int. Cl.⁴ ............................................. C03C 27/02
[52] U.S. Cl. .................................... 428/630; 428/611; 428/678; 428/679; 428/680; 428/681; 428/682; 428/928
[58] Field of Search ............... 428/607, 611, 630, 678, 428/679, 680, 681, 682, 928

[56] References Cited

U.S. PATENT DOCUMENTS 3,661,570  5/1972  Moss .................................... 428/928
4,049,522  9/1977  Ainslre et al. ....................... 428/928

FOREIGN PATENT DOCUMENTS 55-30841  3/1980  Japan .................................... 428/678

Primary Examiner—John P. Sheehan
Attorney, Agent, or Firm—Hill, Van Santen, Steadman & Simpson

[57] ABSTRACT

A magnetic alloy thin film consisting essentially of a first Fe-Al-Si or Fe-Ni alloy thin film of high permeability and a second Fe-Si alloy thin film directly formed on the first thin film and having high saturation magnetic flux density. The ratio in thickness of the first and second films is preferably in the range of from 1:0.1 to 2.

2 Claims, 8 Drawing Figures

MAGNETIC COMPOSITE FILM

BACKGROUND OF THE INVENTION

1. Field of the Invention

This invention relates to magnetic alloy thin films which are particularly suitable for use as a material for magnetic transducer heads for VTR adapted to use in association with magnetic recording media having high coercive force, such as metal magnetic tapes, and which have high saturation magnetic flux density and high permeability.

2. Description of the Prior Art

Among known ternary alloys of Fe—Al—Si, an alloy having a composition of Si≃9.5 wt % and Al≃5.4 wt % is called Sendust alloy. This alloy has a magnetostriction constant and crystalline magnetic anisotropy constant of each approximately zero, with very good soft magnetic properties. Although the Sendust alloy has poor workability and is difficult in making thin pieces by machining, it is easy to obtain a thin film from the alloy by utilizing thin film formation techniques such as sputtering. In addition, the alloy has good resistances to corrosion and wear, so that it may be utilized as a core material for magnetic transducer head, which is used in a high frequency range such as in VTR. On the other hand, one of measures of improving a recording density in magnetic recording art includes use of a shorter wave for recording. However, in order to suppress the self-demagnetizing effect while permitting recording and reproduction of high quality, it is necessary to increase the coercive force of a recording medium. To this end, magnetic recording media having high coercive force, e.g. metal magnetic tapes, have appeared. In order to permit complete recording and erasure while making the best use of the characteristics of the magnetic recording media having high coercive force, materials for magnetic transducer heads should have high saturation magnetic flux density in correspondence to the high saturation magnetic flux density of the magnetic media. If recording and reproducing operations are effected on the same head, permeability as well as the saturation magnetic flux density should be high.

At present, attention is directed to the Sendust alloy since the alloy is considered to be a material which almost satisfy the above requirements. However, the saturation magnetic flux density of the Sendust alloy is about 11000 G and cannot be a material which makes the best use of the characteristics of a metal magnetic tape having a coercive force (Hc) of about 1400 Oe. Thus, there is a high demand for materials which have a saturation magnetic flux density higher than the Sendust alloy and have a permeability equal to or larger than the Sendust alloy.

It will be noted that if it is sufficient to increase only the saturation magnetic flux density, this may be achieved, to an extent, by reducing the contents of Si and Al in the Sendust alloy composition. However, when the Sendust alloy is so formulated as to deviate from a so-called standard composition, it becomes difficult to make the magnetostriction and magnetic anisotropy zero at the same time. This will impede soft magnetic properties inherent to the Sendust alloy.

SUMMARY OF THE INVENTION

It is accordingly an object of the present invention to provide a magnetic alloy thin film which has high saturation magnetic flux density and high permeability.

It is another object of the invention to provide a magnetic alloy thin film which has a specific type of laminate structure whereby high soft magnetic characteristics are attained.

It is a further object of the invention to provide a magnetic alloy thin film which is suitably utilizable as a core material for magnetic transducer head and contributes to remarkably improve recording and reproducing characteristics.

According to the invention, there is provided a magnetic alloy thin film which consists essentially of a first thin film of an Fe—Al—Si or Fe—Ni alloy having high permeability and a second thin film of an Fe—Si alloy having high saturation magnetic flux density, the second film being directly formed on the first thin film. The thin film of the invention has a laminate structure including the first and second thin films and thus has, as a whole, high saturation magnetic flux density and high permeability.

DETAILED DESCRIPTION AND EMBODIMENTS OF THE INVENTION

The magnetic alloy thin films of the present invention is a laminate or combination of a first thin film of an Fe—Al—Si or Fe—Ni alloy having high permeability, and a second thin film of an Fe—Si alloy having high saturation magnetic flux density directly formed on the first thin film.

In the practice of the invention, the Fe—Al—Si alloy for the first thin film should preferably have a composition of 82-88 wt % of Fe, 4-7 wt % of Al and 8-11 wt % of Si. With the Fe—Ni alloy thin film, the alloy should preferably have 20-22 wt % of Fe and 78-80 wt % of Ni. With the second Fe—Si alloy thin film, the alloy should preferably have 92-96 wt % of Fe and 4-8 wt % of Si.

At least one of the alloy thin films may comprise small amounts of elements other than the above essential elements. The ratio in thickness between the first Fe—Al—Si or Fe—Ni alloy thin film and the second Fe—Si alloy thin film is preferably in the range of 1: 0.1-2.0. The ratio less than 1:0.1 is unfavorable because the saturation magnetic flux density is not improved so much, whereas the ratio exceeding 1:2.0 is also unfavorable because an improvement of saturation magnetic flux density cannot be also expected.

Annealing, which is necessary for making the magnetic alloy thin film of the present invention, may be effected two times, one after formation of a first alloy thin film and the other after subsequent formation of a second alloy thin film. Alternatively, the annealing may be effected only one time after formation of either of the alloy thin films. The annealing temperature is generally in the range of 400°–600° C. Temperatures lower than 400° C. result in a reduced annealing effect, whereas temperatures exceeding 600° C. give an adverse influence on substrate.

As a matter of course, the magnetic alloy thin film of the invention may be formed on a substrate such as glass or other materials ordinarily used for these purposes.

The present invention is more particularly described by way of examples.

EXAMPLE 1

Figure 1:
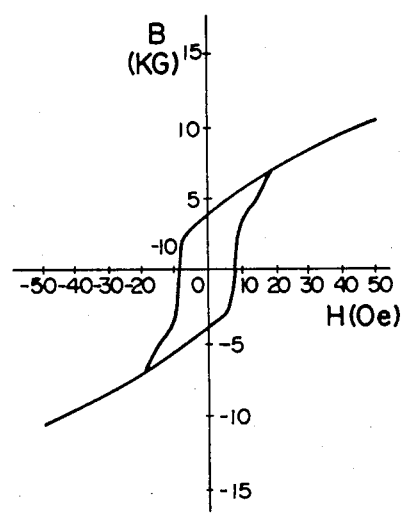
FIGS. 1 and 2 are graphs of B-H loops prior to and after annealing of a magnetic alloy thin film of the invention obtained by deposition of an Fe—Si alloy thin film on an Fe—Al—Si alloy thin film, respectively.
Figure 2:
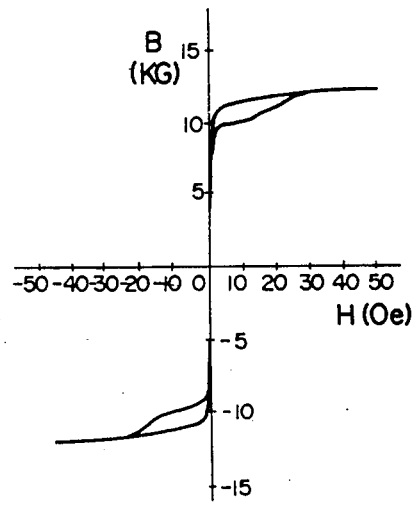
Figure 4:
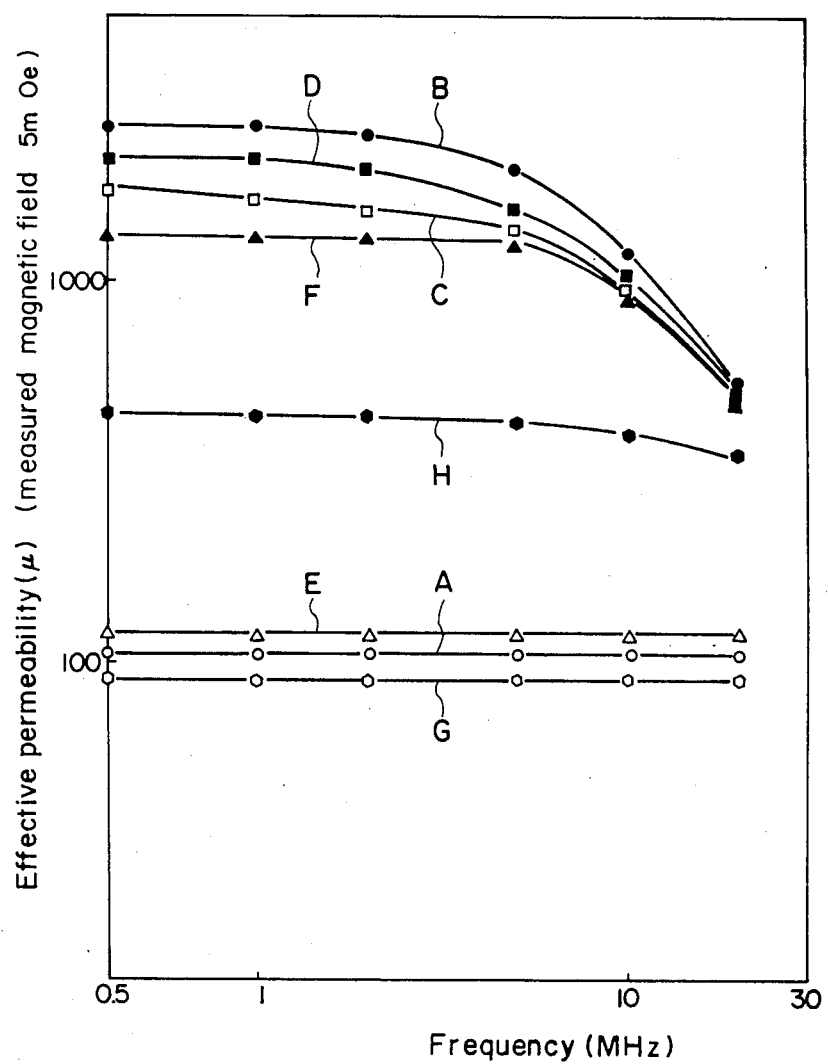
FIG. 4 is a graph showing effective permeabilities, in relation to frequency, of the magnetic alloy films of examples and comparative examples prior to and after annealing, respectively.

On a crystalline glass substrate which had been mirror polished on the surface thereof was deposited, by R.F. sputtering, a 4 μm thick Fe—Al—Si alloy (Sendust alloy) having a composition of 9.5 wt % of Si, 5.4 wt % of Al and 85.1 wt % of Fe. Thereafter, an Fe—Si alloy of 1 μm thickness having a composition of 6.5 wt % of Si and 93.5 wt % of Fe was deposited, by sputtering, on the Sendust alloy thin film. This sequentially deposited magnetic alloy thin film was annealed under vacuum at 500° C. for 1 hour and then subjected to measurement of a magnetic flux density B in relation to magnetization H. The results are shown in FIGS. 1, 2 and 4. More particularly, FIG. 1 shows an a.c. B-H loop prior to annealing and FIG. 2 shows an a.c. B-H loop after annealing. The frequency used for the measurement of the B-H loops is 8 Hz and the maximum magnetic field for the measurement is 50 Oe. In FIG. 4, straight line A is a variation of permeability prior to annealing which was measured in a measuring magnetic field of 5 mOe and curve B is a variation of permeability after annealing.

EXAMPLE 2

An Fe—Al—Si alloy of the same composition as used in Example 1 was deposited on the substrate in a thickness of 4 μm in the same manner as in Example 1. This sample was annealed under vacuum at 500° C. for 1 hour, followed by depositing an Fe—Si alloy of the same composition as in Example 1 in a thickness of 1 μm. Subsequently, the combination magnetic alloy film was again annealed under vacuum at 500° C. for 1 hour. The laminated magnetic alloy thin film was subjected to measurement of permeability in a measuring magnetic field of 5 mOe. The results are shown in FIG. 4, in which curve C is a variation of permeability prior to annealing and curve D is a variation of permeability after annealing.

EXAMPLE 3

Figure 3:
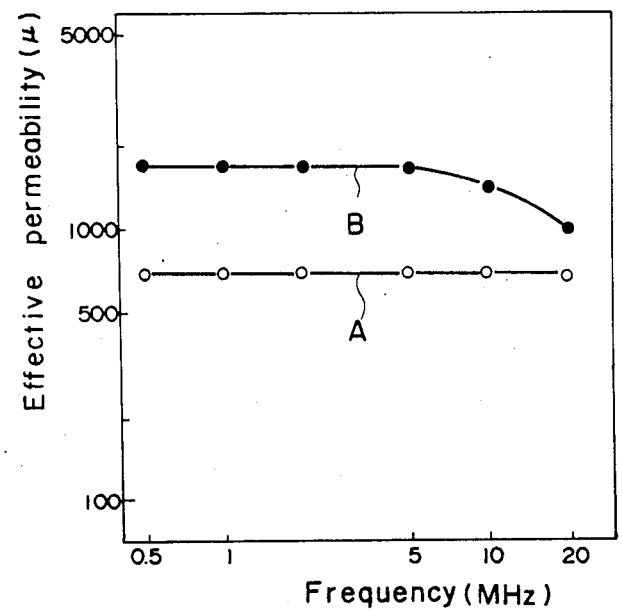
FIG. 3 is a graph of an effective permeability, in relation to frequency, of a magnetic alloy thin film of the invention obtained by deposition of an Fe—Si alloy thin film on an Fe—Ni alloy thin film.

An Fe—Ni alloy (Permalloy) having a composition of 20 wt % of Fe and 80 wt % of Ni was deposited on the substrate by sputtering in a thickness of 1.2 μm. Thereafter, an Fe—Si alloy having a composition of 6.5 wt % of Si and 93.5 wt % of Fe was further deposited, by sputtering, on the Permalloy alloy thin film in a thickness of 0.6 μm. Thereafter, the combination magnetic alloy thin film was annealed under vacuum at 500° C. for 1 hour, followed by measurement of a variation of permeability in a measuring magnetic field of 5 mOe. In FIG. 3, straight line A indicates a variation of permeability prior to annealing and curve B indicates a variation of permeability after annealing.

COMPARATIVE EXAMPLE 1

Figure 5:
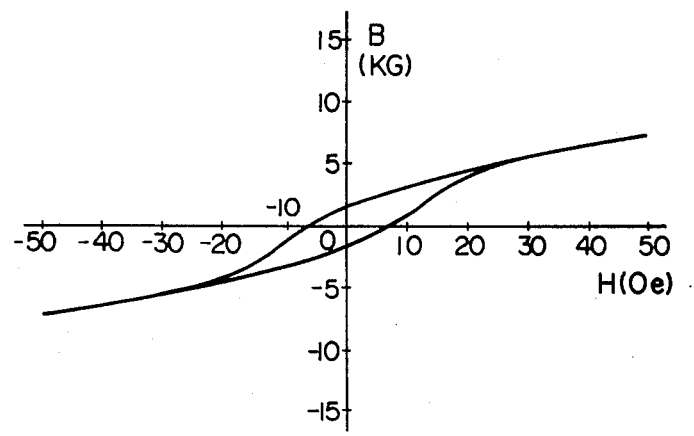
FIGS. 5 and 6 are B-H loops of Fe—Al—Si alloy thin film prior to and after annealing, respectively.
Figure 6:
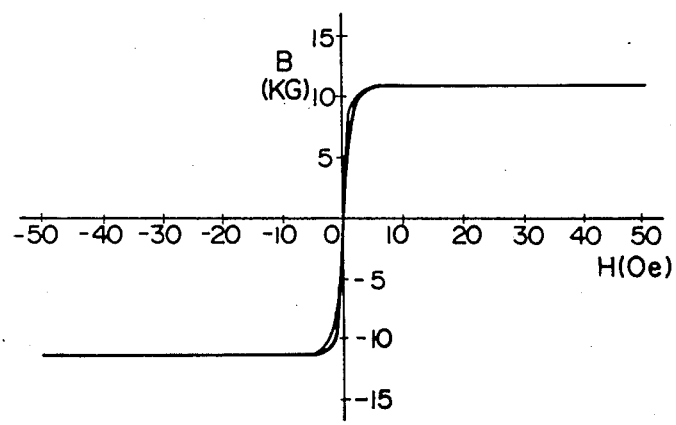

An Fe—Al—Si alloy of the same composition as used in Example 1 was deposited on the substrate in the same manner as in Example 1. This sample was annealed under vacuum at 500° C. for 1 hour, followed by measurement of magnetic flux density B in relation to magnetization H under conditions of a measuring magnetic field of 50 Oe and a measuring frequency of 8 Hz. FIG. 5 shows an a.c. B-H loop prior to annealing of the Fe—Al—Si alloy thin film, and FIG. 6 shows an a.c. B-H loop after annealing. In FIG. 4, straight line E is a variation of permeability, prior to annealing, measured in a magnetic field of 5 mOe, and curve F is a variation of permeability after annealing.

COMPARATIVE EXAMPLE 2

An Fe—Si alloy of the same composition as used in Example 1 was deposited on the substrate in a thickness of 1 μm in the same manner as in Example 1. This sample was annealed under vacuum at 500° C. for 1 hour, followed by measurement of magnetic flux density B in relation to magnetization under condition of a measuring magnetic field of 50 Oe and a measuring frequency of 8 Hz.

Figure 7:
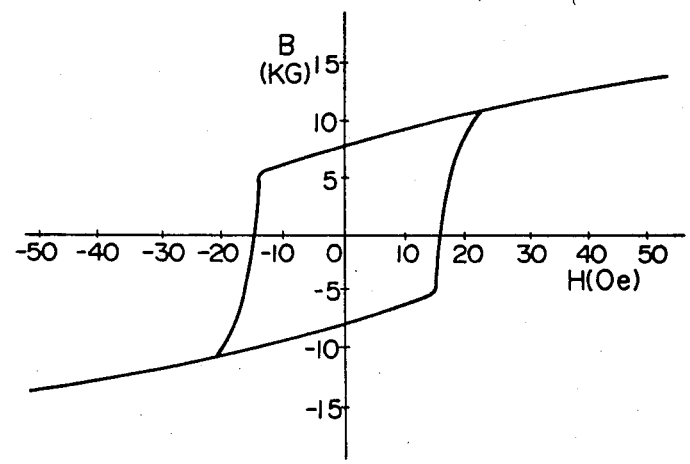
FIGS. 7 and 8 are B-H loops of an Fe—Si alloy thin film prior to and after annealing, respectively.
Figure 8:
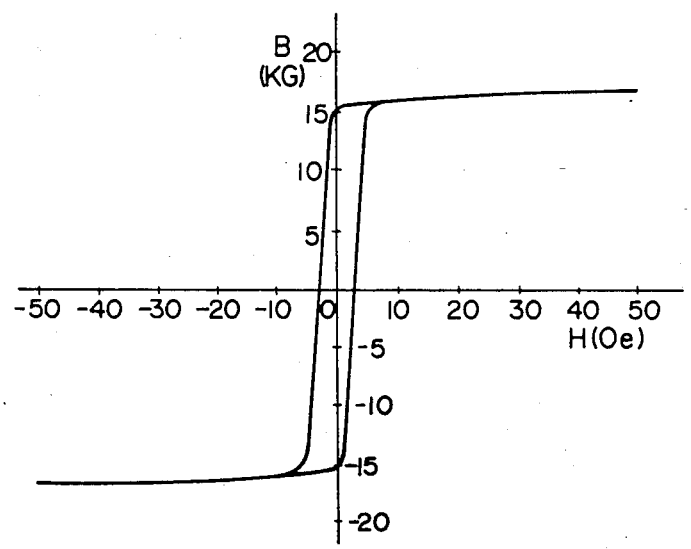

FIG. 7 shows an a.c. B-H loop prior to annealing of the Fe—Si alloy thin film, and FIG. 8 shows an a.c. B-H loop after annealing. In FIG. 4, straight line G is a variation of permeability, prior to annealing, measured in a magnetic field of 5 mOe, and curve H is a variation of permeability after annealing.

As will be seen from the results of examples and comparative examples, the magnetic alloy thin films of the laminate structure comprising the Fe—Al—Si alloy thin film and the Fe—Si alloy thin film have not only an increased saturation magnetic flux density, but also a higher permeability than a magnetic alloy thin film consisting of a Sendust alloy single layer. Although the Fe—Si alloy itself has high saturation magnetic flux density (i.e. 18000 G), the permeability is low as particularly shown by straight line G and curve H and thus, this alloy cannot be practically utilized as a material for magnetic transducer head. In contrast, as shown by the a.c. B-H loops of examples, the magnetic alloy thin films of the invention and particularly, a combinatin of a 4 μm thick Sendust alloy thin film having a saturation magnetic flux density of 11000 G on which 1 μm thick Fe—Si alloy thin film having a saturation magnetic flux density of 18000 G is deposited, has a total saturation magnetic flux density as high as 12400 G from a simple calculation of $(11000 \times 4 + 18000 \times 1)/5$. This results in an increase by 1400 G as compared with the case of the Sendust alloy thin film alone. With regard to permeability, the magnetic alloy thin film of the invention is higher than a Sendust alloy thin film alone. Thus, the magnetic alloy thin film of the invention is considered to be suitable as a material for magnetic transducer head for both recording and reproducing operation.

Likewise, with the magnetic alloy thin film consisting of the laminate structure of an Fe—Ni alloy thin film and an Fe—Si alloy thin film, the total saturation magnetic flux density is calculated as $(10000 \times 1.2 + 17000 \times 0.6)/1.8 = 12300$ G upon lamination in the thicknesses shown in Example 3. This results in an increase by 2300 G as compared with the Permalloy thin film alone. The thin film of the invention is also high in permeability as shown in FIG. 3.

Thus, the magnetic alloy thin film of the invention has much improved characteristics, which is believed to derive from the combination structure which comprises a first thin film of an Fe—Al—Si alloy or Fe—Ni alloy having high permeability, and a second Fe—Si alloy thin film directly formed on the first alloy film and having a high saturation magnetic flux density. In the practice of the invention, a plurality of the laminates may be further laminated through spacers of a non-magnetic material such as $SO_2$. If the relative ratio in thickness of both alloy thin films is changed, an arbitrary saturation magnetic flux density may be obtained, which is one of prominent features of the magnetic alloy thin film of the invention. In addition, annealing is an important treatment in order to improve characteristics of the thin film. It will be noted that since Permalloy has poor wear resistance, it may be utilized as a material for magnetic transducer head by lamination with Sendust alloy.

What is claimed is:

1. A magnetic composite comprising:
a non-magnetic substrate, and
a magnetic thin film structure formed on said substrate, said magnetic thin film structure consisting essentially of a first thin film having high permeability and formed of an Fe—Al—Si alloy containing 82 to 88 weight % Fe, 4 to 7 weight % Al, and 8 to 11 weight % of Si or an Fe—Ni alloy containing 20 to 22 weight % Fe and 78 to 80 weight % Ni, said first thin film being applied by sputtering, and a second thin film having a high saturation magnetic flux density and formed of an Fe—Si alloy containing 92 to 96 weight % Fe and 4 to 8 weight % Si, said second thin film being applied by sputtering after application of said first thin film, the ratio of thickness of the first and second thin films being in the range from 1:0.1 to 2.0.

2. A magnetic composite according to claim 1 wherein said thin film structure is obtained by annealing at a temperature between 400° and 600° C. after sputtering.

* * * * *